June 3, 1930. J. A. DUNNING 1,761,982
PISTON
Filed Sept. 23, 1929 2 Sheets-Sheet 1
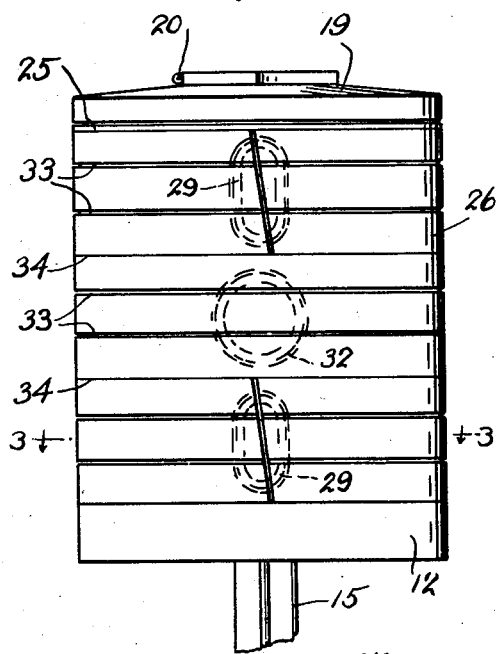
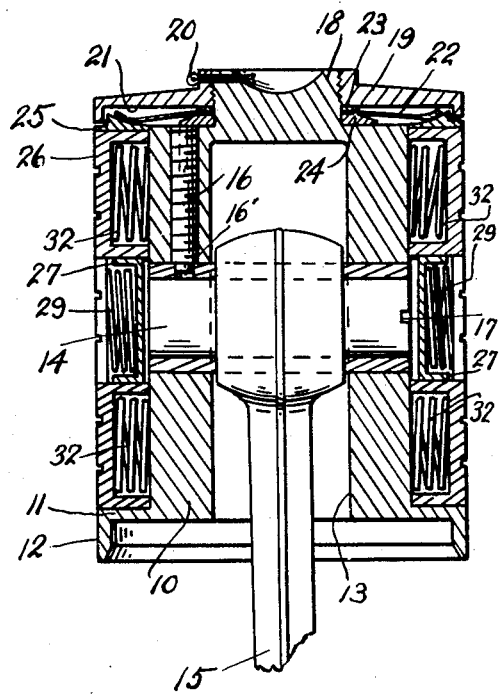
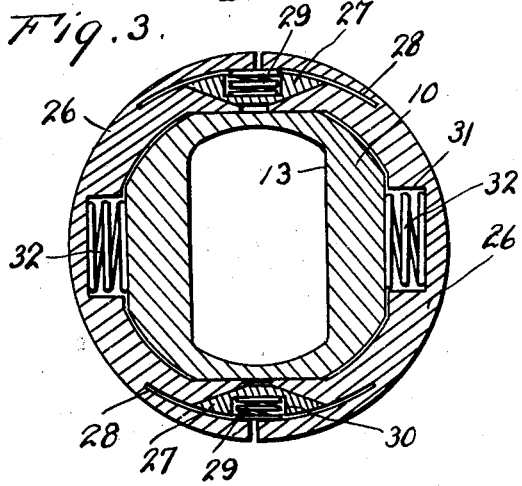
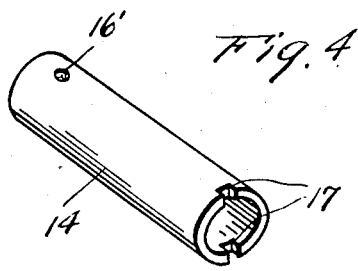
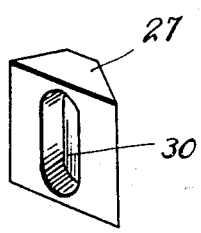
Inventor
James A. Dunning
By Clarence A. O'Brien
Attorney June 3, 1930.    J. A. DUNNING    1,761,982
PISTON
Filed Sept. 23, 1929    2 Sheets-Sheet 2

Inventor
James A. Dunning
By Clarence A O'Brien
Attorney

Patented June 3, 1930

1,761,982

UNITED STATES PATENT OFFICE

JAMES A. DUNNING, OF SUFFOLK, VIRGINIA, ASSIGNOR OF ONE-THIRD TO VERNON S. MAYBERRY, OF PORTSMOUTH, VIRGINIA, AND ONE-THIRD TO CARSON S. DUNNING, OF ROCKY MOUNT, NORTH CAROLINA

PISTON

Application filed September 23, 1929. Serial No. 394,513.

The present invention relates to a piston designed particularly, although not necessarily, for internal combustion engines.

The prime object of the invention resides in the provision of a piston having a construction affording expansion by means of a plurality of semi-cylindrical segments with proper means tending to push such segments outwardly into engagement with the wall of a cylinder, together with suitable joint valves, for the purpose of preventing the passage of gases between the piston and the wall of the cylinder, thereby eliminating the necessity of using packing rings.

Another very important object of the invention resides in the provision of a piston with a much larger area of expansive surface and greater range of expansion which will afford efficient compression and vacuum seal with less wall friction than the conventional ring piston, thereby maintaining its efficiency longer and with less wear than the ring piston; its construction also providing balanced upper and lower resistance lengthwise the piston as against the oblique thrust of the connecting rod, thereby preventing piston slap.

With the above objects in view, the invention resides in certain novel features of construction and in the combination and arrangement of parts as will hereinafter be more fully described and claimed.

In the drawings:—

Figure 1 is a side elevation of a piston embodying the features of the invention.

Figure 2 is a vertical sectional view of Figure 1.

Figure 3 is a horizontal section through segments and core taken approximately on the line 3—3 of Figure 1.

Figure 4 is a detail perspective view of a wrist pin.

Figure 5 is a detail perspective view of a valve.

Figure 6:
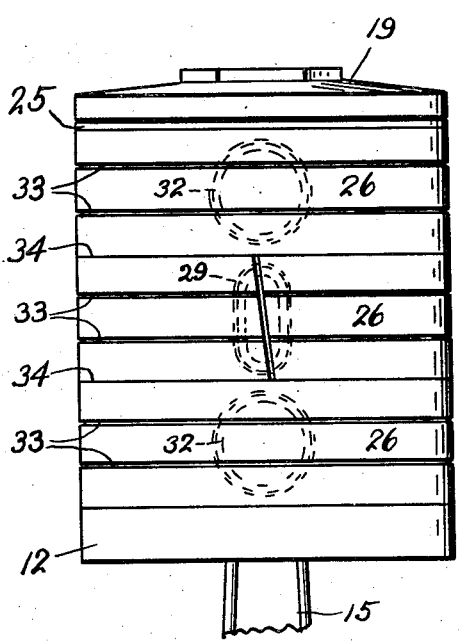
Figure 6 is a side elevation taken at right angles to Figure 1.
Figure 7:
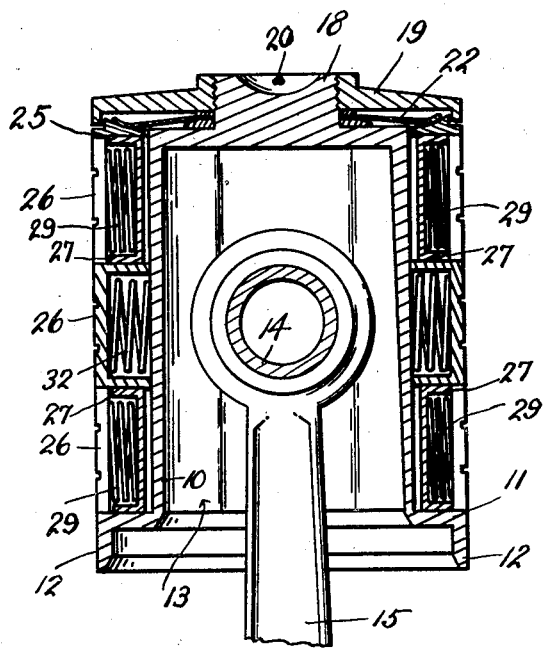
Figure 7 is a vertical sectional view of Figure 6.
Figure 8:
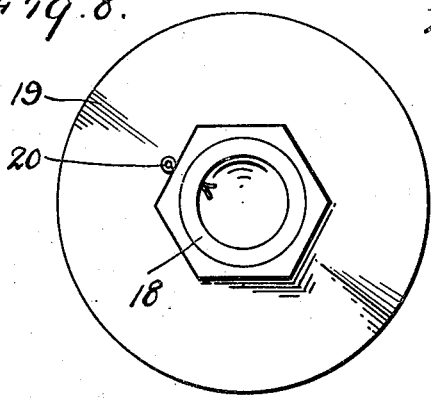
Figure 8 is a plan view of the upper head or cap.
Figure 9:
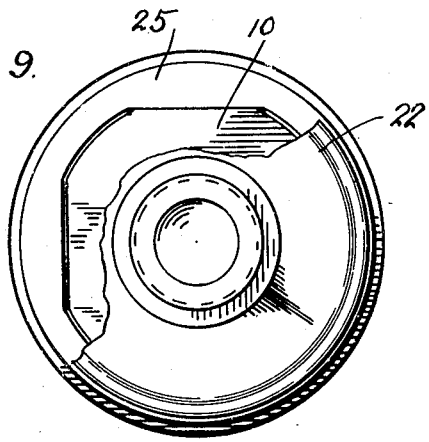
Figure 9 is a top plan view of the spring disc mounted on the piston, a portion thereof being broken away to show the seal plate.

Referring to the drawings in detail, it will be seen that the numeral 10 denotes an octagonal core with four plane and four curved faces and a circular flange 11 having a skirt-like projection 12 in which end is formed a cavity 13 for the connecting rod, which end I shall hereinafter refer to as the bottom end for convenience only.

Near the middle portion, the core is provided with diametrically extending bores in which a hollow wrist pin 14 is mounted to extend across the cavity 13 and a conventional or any preferred type of connecting rods 15 is rockably engaged thereon in the usual well known manner.

A safety type set screw 16 is threaded through the core 10 from the upper end of the core and has a reduced end projecting into an opening 16' provided near one end of the wrist pin 11 so as to prevent movement of the wrist pin with respect to the core. Indentations 17 at the end of the wrist pin serve to seat a wrench for rotating the wrist pin to correct position.

A reduced threaded extension 18 is formed at the upper end of the core 10 and has threadably engaged thereon a head 19 which is locked against rotation by a cotter pin 20 or other suitable means.

The head 19 is formed with an inner circular walled recess 21 for housing a thin annular spring disc 22 which is fitted to slip over the threaded extension 18 of the core 10.

The spring disc 22 is formed flat paralleling the contact of the washers 23 and 24 on either side, then slightly angled toward the rim, then reverting to form a slightly curved thickened rim which presses against a corresponding seat on the seal plate 25. (The lower washer should be large enough to extend part way over the set screw 16 to lock said set screw; with upper side beveled to provide clearance for the spring disc.)

The seal plate 25 is a comparatively thin disc of the same diameter as the head 19 with an opening shaped to fit and slip over the octagonal end of the core 10, one side with plane surface abutting against the upper pair of segments and the other side shaped to seat the curved rim of the spring disc 22 and shouldered to underlap the projection of the head 19; thereby providing, when all the parts are properly fitted and assembled, a pressing but flexible contact of all transverse abutments between the spring disc and the lower head 11 of the core 10. (Gas pressure entering the aperture between the head and the seal plate tends to augment the pressure of the spring disc and cannot pass beyond it into the interior of the piston.)

The wall of the piston is formed of three pairs of semi-cylindrical segments 26 fitted to slip over and register with the corresponding planes of the core 10 to insure diametrical movement of the segments and to prevent lateral play of the segments in respect to the core.

All the segments are identical in size and construction and have their abutting edges formed with inner beveled indentations to receive and seat the valves 27 provided for sealing the joints interiorly, the valve recess being extended circumferentially by a thin slot 28 to form flexible flaps on either side of the joints, the ends of these flaps resting upon an oblong compressed coil spring 29 seated within a cavity 30 in valve 27, the tension of the spring tending to press the valve inwardly against its seat and the flaps outwardly against the wall of the cylinder. (Pressure of the valve spring must be in excess of the resistance of the flaps sufficient to compensate for wear and maintain fitting contact of the flaps with the cylinder wall.) (The slots forming the flaps must stop before reaching one quarter of the circumference of the circle to avoid communication with the slots in the opposing pairs of segments which are disposed at right angles.)

The valve 27 is formed with parallel ends fitted to register with the transverse faces of the segments, with longitudinal faces corresponding to and registering with the angular abutments on either side of the joint and intersected by a plane parallel to the core but separated from the core by sufficient space to provide for inner movement to compensate for wear; the top side being formed to correspond to the circumferential slots, with an oblong cavity for housing the spring 29. The foregoing is illustrated most clearly in Figures 3 and 5 of the drawing.

Circular walled sockets 31 are centrally located within the middle planes of the segments 26 in which are housed compressed coil springs 32 the ends of which impinge against the bottom of the sockets and the opposing planes of the core 10, tending to spread the segments away from the core and from each other against the wall of the cylinder in which the piston may be disposed.

Sufficient clearance must be provided between the core 10 and the opposing planes of the segments, and between the abutting ends of the flaps, and between the valves and the flaps to permit expansion to be absorbed by the springs; likewise, similar clearance must be provided in fitting the heads and the seal plate; thereby permitting exact fitting of the expanding portion of the piston without danger of the piston sticking in the cylinder or generating excessive wall friction.

The spring disc pressure must be strong enough to insure efficient seal of all the transverse joints; while the pressure of the coil springs must be sufficient to overcome the braking effect of the spring disc together with minimum excess to provide efficient seal between the piston and the cylinder wall. The sequence of such transverse pressures being that the pressure of the segments against the cylinder wall is diminished to the extent of the braking effect of the spring disc; while, conversely, the resistance to contraction in circumference of the piston is likewise increased. The fluctuating differences in expansion as between the piston and the cylinder wall being in such manner absorbed by the springs, a fitting contact is thereby maintained with minimum frictional resistance.

Requisite tension of the springs must need be determined by experiment; and, by reason of the restricted space, adequate tension with maximum resiliency could best be attained with spring material of flat shape and oval edge; also, it must be of such character as will withstand the prevailing high temperatures without deterioration of elasticity; this qualification likewise applying for the spring disc. (Probably Monel metal or some similar nickel alloy would be well adapted for the purpose.)

The segments are provided with encircling oil grooves 33 located away from the transverse joints 34 in order to avoid communication circumferentially between the longitudinal joints.

In assembling the piston, the wrist pin 14 is inserted through the bores and the connecting rods 15 and fastened with the lock screw 16.

The segments 26 may then be assembled about the core 10; beginning at the lower head, with the coil springs 32 inserted in the sockets 31, the first pair of segments is disposed with the joints transverse in relation to the wirst pin and pressed together and a suitable retaining band (not shown) disposed over the segments to hold them together; then, with the oblong coil springs 29 inserted and pressed down into their cavities 30, the valves 27 may be entered and pressed into their places, bridging the joints. The second or middle pair of segments is likewise assembled, but disposed diametrically at right angles to the first pair, and the retaining band slipped up to engage over both the lower and the middle segments; then the valves and their springs pressed into their places as before.

And proceeding likewise with the upper pair of segments, but disposed diametrically at right angles to the middle pair, and the retaining band slipped up to engage over all the segments; then the valves and their springs pressed into their places, as with the others.

The seal plate 25 is then slipped on to the end of the core 10, with the plane face abutting against the segments; then the larger washer 24 with the beveled side up; then the spring disc 22 with the rim against its seat on the seal plate, followed by the smaller washer 23 and last, the head 19 is screwed on hard up against the washer, thereby imparting tension to the spring disc and securely closing all apertures surrounding the threaded extension of the core 10 and all joints both transverse and longitudinal. The hole for the cotter pin is then drilled and the cotter pin inserted and fastened, locking the head against displacement.

The piston may now be slipped into the cylinder and of course, the retaining band will be forced off the piston as will be quite apparent. The band must be used also for removing the piston from the cylinder.

It is believed that the many advantages of a piston constructed in accordance with this invention will be readily understood and although the preferred embodiment of said invention is as illustrated and described, it is to be understood that changes in the details of construction may be had which will fall within the scope of the invention as claimed.

What is claimed is:—

1. A piston of the character described comprising a core, a circumferentially extending head on the lower end of the core, substantially semi-circular separable segments encircling the core and mounted on the head, expansible springs positioned between the segments and the core and resilient means mounted on said core for yieldingly urging the segments against the head.

2. A piston ring of the character described comprising a core having connected plane and arcuate side portions, a circumferentially extending head on the lower end thereof, a plurality of superposed pairs of substantially semi-circular segments incircling the core and mounted on the head, expansible springs between the core and the segments, a threaded extension on the upper end of the core of less diameter than said core, an annular sealing ring on the adjacent segments having an inclined upper face, a resilient disc encircling the extension with its peripheral portion engaging the inclined face of the sealing ring and means mounted on the extension for engagement with the disc for maintaining the same under tension on the sealing ring for urging same, together with the segments toward the head.

3. A piston of the character described comprising a core having connected plane and arcuate side portions, a circumferentially extending head on the lower end thereof, a plurality of superposed pairs of substantially semi-circular segments encircling the core and mounted on the head, expansible springs between the core and the segments, the adjacent end of each pair of segments being provided with opposed recesses having an arcuate front wall and a beveled rear wall and being further provided with a circumferentially extending slit communicating with the recesses providing a yieldable tongue on each end of the segments, a substantially wedge-shaped valve extending into the opposed recesses and having a socketed forward face, an expansible spring seated in the socket and engaging the adjacent end portions of the flaps for urging the same outwardly, and resilient means mounted on the core for urging the segments toward the head.

In testimony whereof I affix my signature.
JAMES A. DUNNING.